United States Patent
Barillet et al.

(10) Patent No.: US 9,777,807 B2
(45) Date of Patent: Oct. 3, 2017

(54) TENSIONING DEVICE AND METHOD FOR ASSEMBLING SUCH A TENSIONING DEVICE

(71) Applicants: Jeremie Barillet, Plaisir (FR); Laurent Cherioux, Tours (FR); Christophe Daubignard, Saint Laurent la Gatine (FR); Tony Gaudrier, Tours (FR); Pascal Mauroy, Saint-Cyr-sur-Loire (FR); Thierry Prouteau, Tours (FR); Sebastien Schultz, Epone (FR); Philippe Weber, Fondettes (FR)

(72) Inventors: Jeremie Barillet, Plaisir (FR); Laurent Cherioux, Tours (FR); Christophe Daubignard, Saint Laurent la Gatine (FR); Tony Gaudrier, Tours (FR); Pascal Mauroy, Saint-Cyr-sur-Loire (FR); Thierry Prouteau, Tours (FR); Sebastien Schultz, Epone (FR); Philippe Weber, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 139 days.

(21) Appl. No.: 14/737,609

(22) Filed: Jun. 12, 2015

(65) Prior Publication Data
US 2015/0362047 A1    Dec. 17, 2015

(30) Foreign Application Priority Data
Jun. 13, 2014  (EP) .................................... 14305903

(51) Int. Cl.
F16H 7/12        (2006.01)
F16H 7/10        (2006.01)
F16H 7/08        (2006.01)

(52) U.S. Cl.
CPC .......... *F16H 7/1281* (2013.01); *F16H 7/1218* (2013.01); *F16H 2007/081* (2013.01); *F16H 2007/0893* (2013.01); *Y10T 29/49828* (2015.01)

(58) Field of Classification Search
CPC ............. F16H 2007/081; F16H 7/1218; F16H 7/1281; F16H 2007/084; F16H 2007/0893
(Continued)

(56) References Cited

U.S. PATENT DOCUMENTS 4,285,676 A * 8/1981 Kraft ..................... F16H 7/1281
                                                      267/155
4,464,146 A * 8/1984 Arthur .................. F16H 7/1209
                                                      474/133
(Continued)

FOREIGN PATENT DOCUMENTS

DE          19548435 A1      6/1996
DE       102005033056 A1     1/2007
(Continued)

*Primary Examiner* — Henry Liu
(74) *Attorney, Agent, or Firm* — Bryan Peckjian; SKF USA Inc. Patent Dept.

(57) ABSTRACT

A tensioning device comprising a receiver housing, a lever arm mounted on the receiver housing and rotatable with respect to the receiver housing around a first rotation axis, a pulley mounted on the lever arm and rotatable with respect to the lever arm around a second rotation axis parallel to the first rotation axis, and a spring mounted between the receiver housing and the lever arm and adapted to apply a torque for rotating the lever arm around the first rotation axis. The receiver housing and the lever arm are screwed together around the first rotation axis. The spring applies an axial damping effort, parallel to the first axis, on cooperating threaded portions respectively provided on the receiver housing and on the lever arm.

7 Claims, 3 Drawing Sheets

(58) Field of Classification Search
USPC .................................................. 474/135, 112
See application file for complete search history.

(56) References Cited

U.S. PATENT DOCUMENTS

| | | | | |
|---|---|---|---|---|
| 4,473,362 A * | 9/1984 | Thomey | F02B 67/06 | 267/136 |
| 4,557,709 A * | 12/1985 | St. John | F16H 7/1218 | 474/117 |
| 4,813,915 A * | 3/1989 | Kotzab | F02B 67/06 | 474/133 |
| 4,886,484 A * | 12/1989 | Hanes | F16H 7/1209 | 474/135 |
| 5,011,460 A * | 4/1991 | Ouchi | F16H 7/1245 | 474/133 |
| 5,234,384 A * | 8/1993 | Shibata | F16H 7/1218 | 474/135 |
| 5,334,109 A * | 8/1994 | Izutsu | F16H 7/1218 | 474/135 |
| 5,453,057 A * | 9/1995 | Gardner | F16H 7/1281 | 474/135 |
| 5,458,541 A * | 10/1995 | Adler | F02B 67/06 | 474/135 |
| 5,478,285 A * | 12/1995 | Bakker | F16H 7/1218 | 474/135 |
| 5,575,727 A * | 11/1996 | Gardner | F16H 7/1281 | 474/135 |
| 5,599,245 A * | 2/1997 | Giese | F16H 7/1218 | 474/135 |
| 5,702,314 A * | 12/1997 | Schmid | F16H 7/1209 | 474/135 |
| 5,772,549 A * | 6/1998 | Berndt | F16H 7/1281 | 474/135 |
| 5,803,849 A * | 9/1998 | Ayukawa | F16H 7/1218 | 474/135 |
| 5,919,107 A * | 7/1999 | Stepniak | F16H 7/1281 | 474/112 |
| 5,964,674 A * | 10/1999 | Serkh | F16H 7/1218 | 474/101 |
| 6,102,820 A * | 8/2000 | Imaharu | F16H 7/1218 | 474/109 |
| 6,264,578 B1 * | 7/2001 | Ayukawa | F16H 7/1218 | 474/109 |
| 6,422,963 B2 * | 7/2002 | Kurose | F16H 7/1218 | 474/101 |
| 6,458,055 B1 * | 10/2002 | Bellamy-Booth | F16H 7/1281 | 474/117 |
| 6,468,172 B1 * | 10/2002 | Lang | F16H 7/1218 | 474/135 |
| 6,565,468 B2 * | 5/2003 | Serkh | F16H 7/1218 | 474/135 |
| 6,605,013 B2 * | 8/2003 | Chambers | F16H 7/1281 | 474/133 |
| 6,609,988 B1 * | 8/2003 | Liu | F16H 7/1218 | 474/133 |
| 6,857,977 B1 * | 2/2005 | Bertelshofer | F16H 7/1218 | 474/109 |
| 6,863,631 B2 * | 3/2005 | Meckstroth | F16H 7/1218 | 474/135 |
| 6,932,731 B2 * | 8/2005 | Kaiser | F16H 7/1218 | 474/112 |
| 7,497,794 B2 * | 3/2009 | Lannutti | F16H 7/1218 | 474/133 |
| 7,507,172 B2 * | 3/2009 | Lehtovaara | F16D 41/206 | 474/109 |
| 7,611,431 B2 * | 11/2009 | Dinca | F16H 7/1281 | 474/112 |
| 7,637,829 B2 * | 12/2009 | Stone | F16H 7/1281 | 474/109 |
| 7,803,078 B2 * | 9/2010 | D'Silva | F16H 7/1218 | 474/112 |
| 7,819,765 B2 * | 10/2010 | Kawahara | F16H 7/1218 | 474/135 |
| 7,887,445 B2 * | 2/2011 | Quintus | F16H 7/1218 | 474/109 |
| 7,946,938 B2 * | 5/2011 | Hallen | F16H 7/1218 | 474/112 |
| 7,985,151 B2 * | 7/2011 | Singer | F16H 7/1218 | 474/117 |
| 8,092,328 B2 * | 1/2012 | Dec | F16H 7/1218 | 474/135 |
| 8,118,698 B2 * | 2/2012 | Guhr | F16H 7/1218 | 474/135 |
| 8,142,314 B2 * | 3/2012 | Antchak | F16H 7/1218 | 474/135 |
| 8,142,315 B2 * | 3/2012 | Dell | F16H 7/1218 | 474/135 |
| 8,353,795 B2 * | 1/2013 | Montani | F16H 7/1281 | 474/118 |
| 8,485,925 B2 * | 7/2013 | Antchak | F16H 7/1218 | 474/135 |
| 8,545,352 B2 * | 10/2013 | Lannutti | F16H 7/1218 | 474/115 |
| 8,613,680 B2 * | 12/2013 | Frankowski | F16H 7/1218 | 474/133 |
| 8,617,013 B2 * | 12/2013 | Ferguson | F16H 7/1218 | 474/135 |
| 8,684,872 B2 * | 4/2014 | Mevissen | F16H 7/1218 | 474/135 |
| 8,784,244 B2 * | 7/2014 | Lannutti | F16D 13/28 | 192/113.32 |
| 9,175,753 B2 * | 11/2015 | Frankowski | F16H 7/1218 | |
| 2001/0024985 A1 * | 9/2001 | Kurose | F16H 7/1218 | 474/101 |
| 2002/0010045 A1 * | 1/2002 | Serkh | F16H 7/1218 | 474/135 |
| 2002/0119850 A1 * | 8/2002 | Dutil | F16H 7/1218 | 474/135 |
| 2003/0083164 A1 * | 5/2003 | MacNaughton | F16H 7/1218 | 474/135 |
| 2003/0119615 A1 * | 6/2003 | Meckstroth | F16H 7/1218 | 474/135 |
| 2003/0216204 A1 * | 11/2003 | Serkh | F16H 7/1218 | 474/135 |
| 2004/0014542 A1 * | 1/2004 | Quintus | F16H 7/1218 | 474/135 |
| 2004/0097311 A1 * | 5/2004 | Smith | F16H 7/1281 | 474/135 |
| 2005/0096168 A1 * | 5/2005 | Serkh | F16H 7/1218 | 474/135 |
| 2005/0181902 A1 * | 8/2005 | Konanz | F16H 7/1218 | 474/135 |
| 2006/0035740 A1 * | 2/2006 | Lehtovaara | F16D 41/206 | 474/237 |
| 2006/0068957 A1 * | 3/2006 | Stone | F16H 7/1281 | 474/135 |
| 2006/0079360 A1 * | 4/2006 | Jung | F16H 7/1218 | 474/135 |
| 2008/0280713 A1 * | 11/2008 | Fischer | F16H 7/1218 | 474/135 |
| 2009/0181815 A1 * | 7/2009 | Guhr | F16H 7/1218 | 474/135 |
| 2009/0239696 A1 * | 9/2009 | D'silva | F16H 7/1218 | 474/135 |
| 2010/0137084 A1 * | 6/2010 | Mevissen | F16H 7/1218 | 474/135 |
| 2010/0173738 A1 * | 7/2010 | Guhr | F16H 7/1218 | 474/135 |
| 2010/0184546 A1 * | 7/2010 | Singer | F16H 7/1218 | 474/135 |
| 2010/0234155 A1 * | 9/2010 | Antchak | F16H 7/1218 | 474/135 |
| 2011/0015017 A1 * | 1/2011 | Serkh | F16H 7/1218 | 474/135 |
| 2011/0256969 A1 * | 10/2011 | Frankowski | F16H 7/1218 | 474/101 |
| 2012/0004059 A1 * | 1/2012 | Ma | F16H 7/1218 | 474/135 |

(56) References Cited

U.S. PATENT DOCUMENTS

| | | | | |
|---|---|---|---|---|
| 2012/0115657 | A1* | 5/2012 | Antchak | F16H 7/1218 |
| | | | | 474/135 |
| 2013/0217525 | A1* | 8/2013 | Crist | F16H 7/1281 |
| | | | | 474/111 |
| 2013/0260933 | A1* | 10/2013 | Dutil | F16H 7/1218 |
| | | | | 474/135 |
| 2014/0287859 | A1* | 9/2014 | Frankowski | F02B 67/06 |
| | | | | 474/135 |

FOREIGN PATENT DOCUMENTS

| | | |
|---|---|---|
| DE | 102006014942 A1 | 10/2007 |
| GB | 2258287 A | 2/1993 |

\* cited by examiner

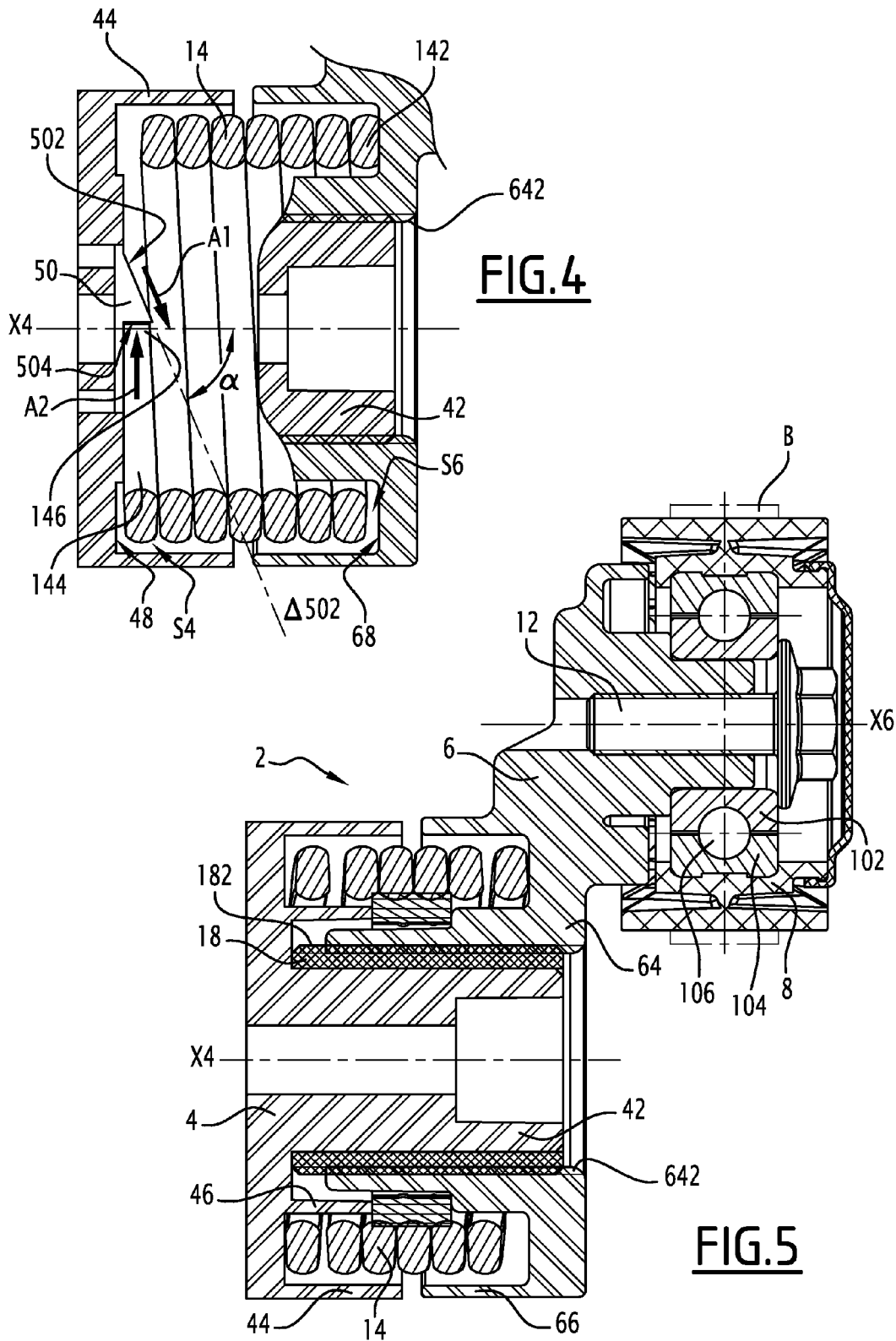

TENSIONING DEVICE AND METHOD FOR ASSEMBLING SUCH A TENSIONING DEVICE

CROSS REFERENCE TO RELATED APPLICATIONS

This is a Non-Provisional Patent application, filed under the Paris Convention, claims the benefit of European Patent (EP) Application Number 14305903.8 filed on 13 Jun. 2014 (13.06.2014), which is incorporated herein by reference in its entirety.

TECHNICAL FIELD OF THE INVENTION

The present invention relates to a tensioning device, in particular a belt tensioning device or a chain tensioning device to be used in an engine, for instance an internal combustion engine of an automotive vehicle, of an off-highway vehicle such as a tractor, of a generator to produce electricity, or a marine pod. The present invention also relates to a method for assembling such a tensioning device.

BACKGROUND ART OF THE INVENTION

In the field of motor vehicles, it is known that the engine drives various accessories, such as an electric generator, a water pump, a fan, etc. via a belt which is driven by a main pulley mounted on a shaft of the engine. This belt circulates around pulleys respectively connected to some accessories. It is known that the tension of the belt must be adjusted at a certain level in order to efficiently drive the accessories, while keeping a satisfactory life time for the belt. This is achieved by using a belt tensioning device which is provided for keeping the tension of the belt at a certain level and also for dampening vibrations resulting from the movements of the belt.

U.S. Pat. No. 5,772,549 discloses a belt tensioning device where a conical sleeve is interposed between a receiver housing and a journal which belongs to a pulley carrier. A spring works in torsion in order to apply a torque which rotates the pulley carrier with respect to the receiver housing. This spring also works in traction in order to pull the journal against the conical sleeve. The traction effort of the spring requires that its terminal coils must be immobilized within respective recesses of the receiver housing, on the one side, and of the pulley carrier, on the other side. Thus, these two parts must have complicated shapes in order to accommodate these terminal coils, which makes them difficult to cast. Moreover, the conical sleeve is made of plastic and the quality and intensity of the damping effort depends on the geometry and on the surface roughness of the sleeves, which are difficult to precisely control.

US-A-2006/0079360 discloses a belt tensioning device where a torsion spring is used to exert a torque, whereas a strip string is used to exert a braking effort. These two springs must be coupled within the device, which is complicated, in particular with respect to proportioning their respective mechanical characteristics.

US-A-2008/0280713 discloses a belt tensioner where a series of disc springs is used to exert a braking effort, independently of the use of a main spring for generating a torque on a tensioning arm. This plurality of disc springs is expensive and they must be carefully manipulated during manufacturing of the belt tensioning device which requires their stacking. Because of the disc spring stacking, this device is bulky in an axial direction. Moreover, since the main spring must be mounted around the disc springs, the tensioning device is also bulky in a radial direction.

Similar problems might occur with chain tensioning devices which can also be used within an engine of a motor vehicle.

SUMMARY OF THE INVENTION

One object of this invention is to provide a tensioning device where a single spring is used to apply a torque on one part of the device and to generate a damping effort, without relying on a conical sleeve and with a better control of the efforts exerted by the spring.

To this end, the invention concerns a tensioning device comprising a receiver housing, a lever arm mounted on the receiver housing and rotatable with respect to the receiver housing around a first rotation axis, a pulley mounted on the lever arm and rotatable with respect to the lever arm around a second rotation axis parallel to the first rotation axis and a spring, mounted between the receiver housing and the lever arm and adapted to apply a torque for rotating the lever arm around the first rotation axis. According to the invention, the receiver housing and the lever arm are screwed together around the first axis, whereas the spring applies an axial damping effort, parallel to the first axis, on cooperating threaded portions respectively provided on the receiver housing and on the lever arm.

The axial damping effort applied by the spring creates friction in the cooperating threads, and this friction creates the damping effect. Owing to the invention, the spring has a double function. It applies an elastic torque, which allows positioning the lever arm with respect to the receiver housing, and a damping effort, which allows dampening the vibrations resulting from the movements of a belt or chain moving around the pulley. Insofar as no conical sleeve and journal must be pulled one against the other, the spring does not have to work in traction, so that the geometry of the receiving housing and the lever arm can be relatively simple since the terminal coils of the spring might come into contact with these two parts, without being engaged in specific recesses. Moreover, thanks to screwing and/or unscrewing of the lever arm with respect to the receiver housing, it is possible to adjust the intensity of the torque and of the axial damping effort exerted by the spring. This allows adjusting the working conditions of the tensioning device to its environment.

According to further aspects of the invention which are advantageous but not compulsory, such a tensioning device might incorporate one or several of the following features taken in any admissible configuration:

- The axial effort is a compression effort exerted by the spring.
- A first end of the spring is integral, in rotation around the first rotation axis, with a first part selected amongst the receiver housing and the lever arm.
- A second part selected between the receiver housing and the lever arm is provided with a stop for a second end of the spring.
- The stop allows the second end of the spring to go over it upon screwing of the lever arm on the receiver housing and the stop blocks the second end of the spring upon unscrewing of the lever arm with respect to the receiver housing.
- In a direction orthoradial with respect to the first rotation axis, the stop includes a first surface inclined with respect to the first rotation axis, and a second surface parallel to the first rotation axis.

The threaded portions are directly formed on the receiver housing and on the lever arm. Alternatively, at least one of the threaded portions is formed on a sleeve located between the receiver housing and the lever arm along a radial direction with respect to the first rotation axis. This sleeve can be integral, in rotation around the first rotation axis, with the receiver housing and has a threaded portion oriented radially towards the lever arm. Alternatively, this sleeve is integral, in rotation around the first rotation axis, with the lever arm and has a threaded portion oriented radially towards the receiver housing. This sleeve can be made of a synthetic material, preferably of PA66.

The receiver housing and the lever arm are made of aluminum or an aluminum based alloy.

This invention also concerns a method for assembling a tensioning device as mentioned here-above, this method including at least the following steps consisting in:
 a) installing the spring between the receiver housing and the lever arm, and
 b) screwing the lever arm and the receiver housing together.

Advantageously, a first end of the spring is integral in rotation with a first part selected amongst the receiver housing and the lever arm and a second part is provided with a stop for the second end of the spring, whereas the method includes at least the further steps consisting in:
 c) fastening, in rotation around the first rotation axis, the first end of the spring with the first part, and
 d) after step b), unscrewing the lever arm with respect to the receiver housing and bringing the second end of the spring in abutment against the stop.

Preferably, the method includes at least a further step e) consisting in, after step d), further unscrewing the lever arm with respect to the receiver housing in order to generate the torque applied by the spring between the receiver housing and the lever arm and to adjust the value of the axial damping effort.

BRIEF DESCRIPTION OF THE DRAWINGS

The present invention and its advantages will be well understood on the basis of the following description, which is given as an illustrative example, without restricting the scope of the invention and in relation with the annexed drawings. In the drawings:

FIG. 4 is a partially cut away view of detail IV on FIG. 2 where a central portion of the receiver housing and a central portion of the lever arm are omitted, in order to show the position of a spring and a tooth; and FIG. 5 is a cut view similar to FIG. 2 for a tensioning device according to a second embodiment of the invention.

DETAILED DESCRIPTION OF SOME EMBODIMENTS

Figure 1:
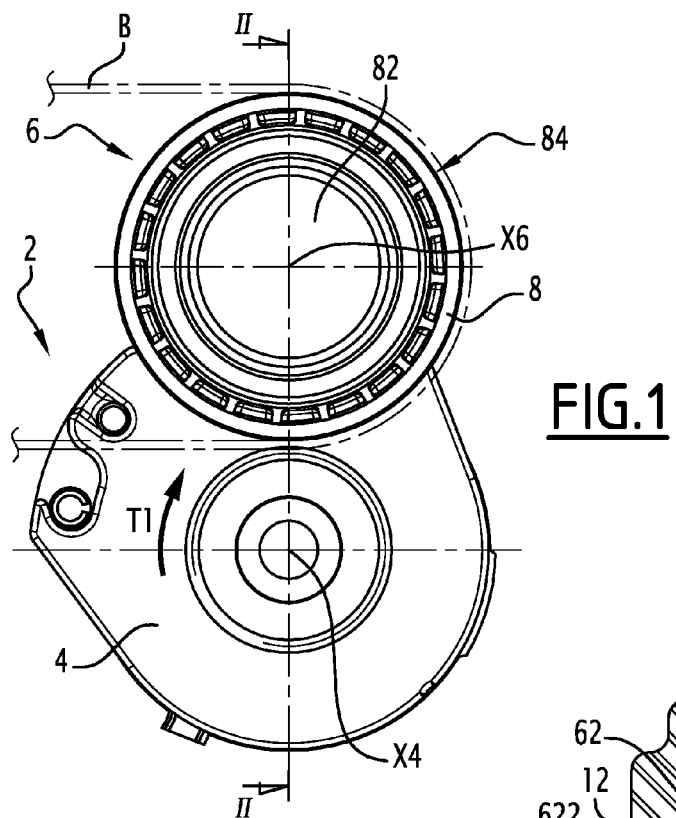
FIG. 1 is a front view of a belt tensioning device according to the invention.

The belt tensioning device 2 represented on FIGS. 1 to 4 includes a receiver housing 4 adapted to be mounted on a crank case of a non-further represented internal combustion engine of an automotive vehicle. The belt tensioning device 2 also includes a lever arm 6 which is pivotably mounted with respect to receiver housing 4 around a first rotation axis X4 defined by receiver housing 4.

Receiver housing can be mounted on a crank case by any known means, such as screws, bolts or rivets.

Lever arm 6 is equipped with a pulley 8 made of a synthetic material which freely rotates around a second rotation axis X6 defined by lever arm 6 and parallel to axis X4. A ball bearing 10 supports the pulley 8 around a cylindrical extension 62 of lever arm 6. Ball bearing 10 includes an inner ring 102 mounted around extension 62, an outer ring 104 mounted radially within pulley 8 and a series of balls 106 interposed between inner and outer rings 102 and 104. A screw 12 is inserted within a threaded hole 622 of extension 62 and pushes inner ring 102 against a shoulder 624 of extension 62, which immobilizes ring 102 around extension 62. Pulley 8 is equipped with a cap 82 which hides bearing 10 and screw 12 in the direction of FIG. 1.

Figure 2:
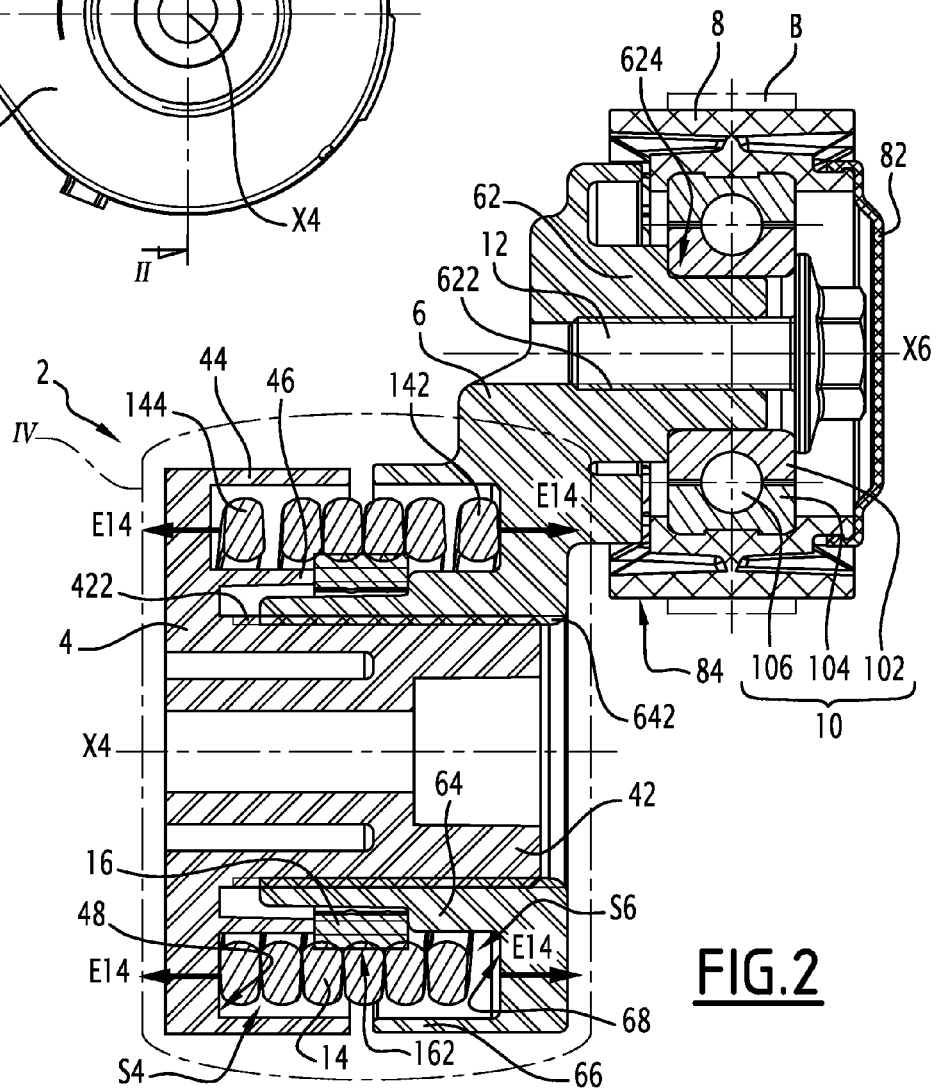
FIG. 2 is an enlarged cut view along line II-II on FIG. 1.
Figure 3:
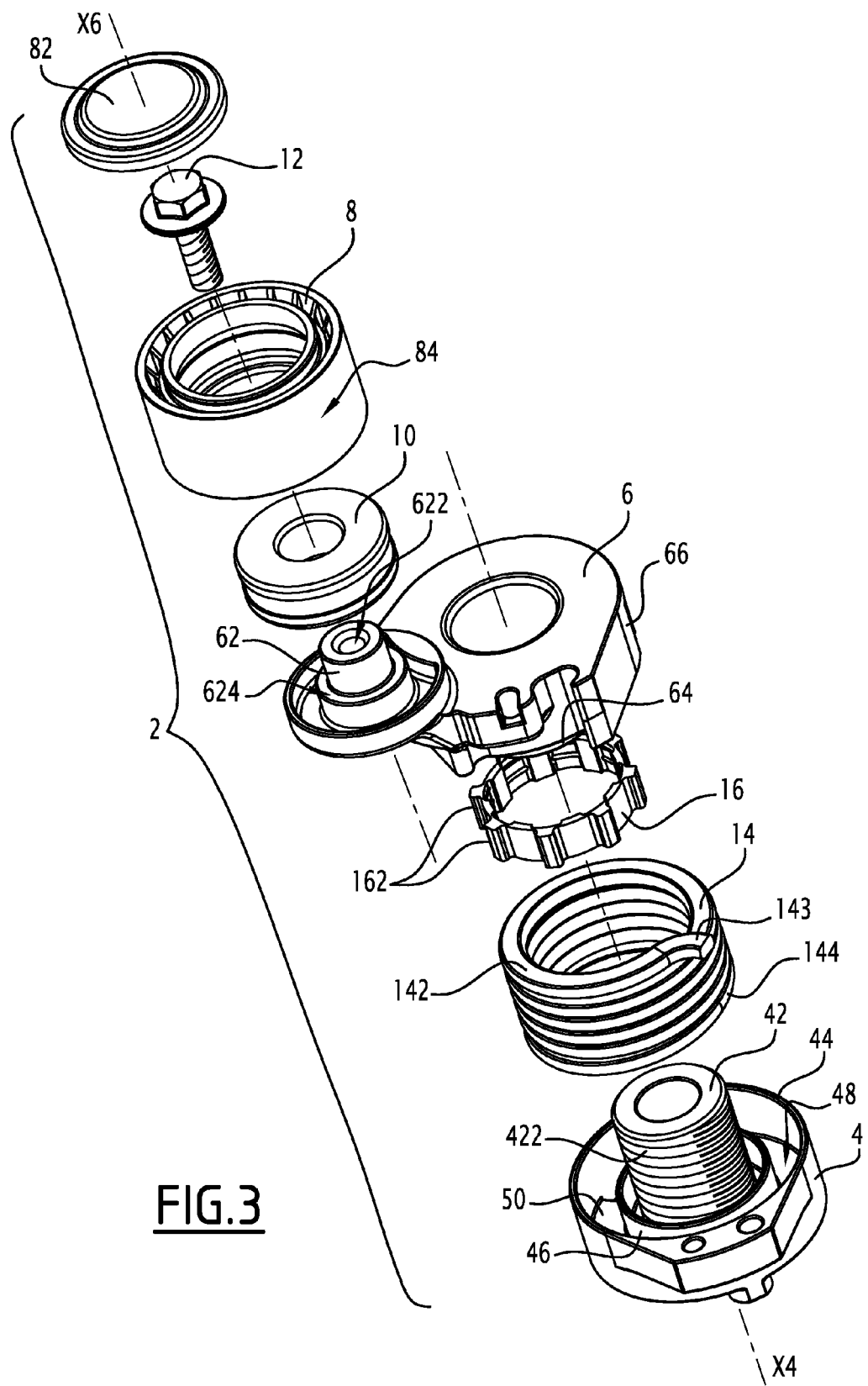
FIG. 3 is an exploded perspective view of the belt tensioning device of FIGS. 1 and 2.

As shown in phantom lines on FIGS. 1 and 2, a belt B can circulate around the outer peripheral surface 84 of pulley 8, as well known for belt tensioning devices.

The angular position of pulley 8 with respect to axis X4 impacts the tension of belt B. This angular position is determined by a torque T1 exerted by a spring 14 which belongs to belt tensioning device 2 and which is interposed between items 4 and 6.

More precisely, receiver housing 4 forms a central hub 42, a peripheral skirt 44 and an intermediate skirt 46, all centered on axis X4. An empty space S4 is defined, radially with respect to axis X4, between skirts 44 and 46 and accommodates a first portion of spring 14.

On the other hand, lever arm 6 includes a central hub 64 and a peripheral skirt 66, both centered on axis X4. An empty space S6 is defined, radially with respect to axis X4, between items 64 and 66 and it accommodates a second portion of spring 4.

Spaces S4 and S6 are annular and aligned along a direction parallel to axis X4. They have the same radial thickness. 48 denotes the bottom surface of empty space S4, that is an annular surface which is perpendicular to axis X4 and connects skirts 44 and 46. Similarly, 68 denotes the bottom surface of empty space 66 which is annular, perpendicular to axis X4 and connects hub 64 and skirt 66.

A first terminal coil 142 of spring 14 is fixedly connected to bottom surface 68. For instance, a free end 143 of terminal coil 142 is anchored within lever arm 6 or fixed by any other means on this part. Alternatively or in conjunction, coil 142 can be welded or glued to surface 68. Thus, when lever arm 4 rotates around axis X4 with respect to receiver housing 4, spring 4 also rotates around this axis.

144 denotes the second terminal coil of spring 14 which is opposite to terminal coil 142. 146 denotes the free end of coil 144.

The outer shape of hub 64 is such that it is partially surrounded by intermediate skirt 46. A lining 16, which is made of an elastic material such as an elastomer, is fitted on the free end of intermediate skirt 46, so that spring 14 slides against some external ribs 162 of lining 16. The function of lining 16 is to avoid high amplitude vibrations of spring 14 which could result from a resonance generated by the vibrations of the environment of belt tensioning unit 2.

Hub 42 is provided with an outer peripheral threaded portion 422 which is centered on axis X4. On the other hand, hub 64 is provided with an inner threaded portion 642 also centered on axis X4. The geometry of threaded portions 422 and 642 is such that they cooperate, so that lever arm 6 can be screwed on receiver housing 4 and unscrewed from this part, by rotating lever arm 6 around axis X4 with respect to receiver housing 4.

As shown on FIG. 4, an inclined tooth 50 protrudes from surface 48, so that it interacts with coil 144 of spring 14. In a direction orthoradial with respect to axis X4 and as shown on FIG. 4, tooth 50 is defined between a sliding surface 502 and a blocking surface 504. Sliding surface 502 extends along a direction 4502 inclined with respect to axis X4. α denotes the angle between direction 4502 and axis X4. The value of angle α is comprised between 5° and 85°, and preferably is approximately 30°. This angle can vary on the basis of the characteristics of spring 14. Blocking surface 504 is parallel to axis X4, thus perpendicular to surface 48.

Upon screwing of lever arm 6 on receiver housing 4, the end 146 of coil 144 slides along surface 502, in the direction of arrow A1 on FIG. 4. Thus, tooth 50 allows end 146 to go over it.

On the other hand, if one starts unscrewing lever arm 6 with respect to receiver housing 4, end 146 of coil 144 comes into abutment against surface 504, as shown by arrow A2, which induces that end 146 is blocked in rotation with respect to receiver housing 4.

During assembly of belt tensioning unit 2, receiver housing 4 is prepared on one side and lever arm 6 is equipped with items 8, 10, 12 and 14. Then, hub 64 is aligned on axis X4 and one screws lever arm 6 on receiver housing 4. This has no influence on the torque exerted by spring 14 on lever arm 6, since its free end 146, which is opposite to surface 68, slides on tooth 50 every 360°. In other words, spring 14 is not twisted by the screwing operation of lever arm 6 on receiver housing 4. Because of this screwing movement, surfaces 48 and 68 come close together, which induces a compression of spring 14. Thus, spring 14 exerts on items 4 and 6 a compression effort E14 which is parallel to axis X4, that is axial, and which tends to spread these two parts apart in an axial direction. This effort E14 acts on threaded portions 422 and 642, to the point that it increases the friction forces between these threaded portions in a substantial way.

Thus, effort E14 brakes a rotation of lever arm 6 around axis X4. In other words, effort E14 has a damping effect on any rotational movement of lever arm 6 around axis X4.

In order to set the value of the torque T1 exerted by spring 4, and once lever arm 6 has been screwed on receiver housing 4, one starts by unscrewing lever arm 6 up to a point where end 146 comes into abutment against surface 504 of tooth 50. From this position, one further unscrews lever arm 6, which induces that spring 14 is twisted and tightened, since its two ends are blocked, respectively with respect to lever arm 6 and with respect to receiver housing 4. Thus, further unscrewing of lever arm 6 allows adjusting the intensity of torque T1. This further unscrewing movement also adjusts the intensity of effort E14, which is lowered, since the compression of spring 14 between surfaces 48 and 68 decreases as a consequence of this unscrewing movement. In other words, unscrewing of lever arm 6 with respect to receiver housing 4 allows adjusting at the same time and in one operation, the intensity of torque T1 and the intensity of axial damping effort E14.

Effort E14 is a compression effort since it results from the compression of spring 14 due to screwing of lever arm 6 on receiver housing 4. Since terminal coils 142 and 144 of spring 14 lie against surfaces 48 and 68, within spaces S4 and S6, no special shape has to be provided for the interaction zones between spring 14 and items 4 and 6. Thus receiver housing 4 and lever arm 6 can be easily obtained by a casting operation.

The axial damping effort E14 has a direct influence on the torque T2 which is necessary to move lever arm 6 with respect to receiver housing 4 in the screwing direction. The following equation applies:

$$T2 = E14*(\sin(\beta) + \mu*\cosinus(\beta))*D/2 \qquad \text{(Equation 1)}$$

where β is the pitch angle of the threaded portions 422 and 642, μ is the friction coefficient between the materials of parts 4 and 6 and D is the mean thread diameter.

Pitch angle β is related to the pitch P of the threads by the following relationship:

$$\beta = \text{arc } tg(P/(2\pi*D/2)). \qquad \text{(Equation 2)}$$

On the other hand, the torque T3 necessary to rotate lever arm 6 with respect to receiving housing 4 in the unscrewing direction can be defined by the following relationship:

$$T3 = E14*(-\sin(\beta) + \mu*\cosinus(\beta))*D/2 \qquad \text{(Equation 3)}$$

Torque T2 and T3 are actually damping torques which resist any vibration movement of lever arm 6 around axis X4. Because of the relationships of equations (1) and (3), it is possible to precisely adjust the values of T2 and T3 by a proper adjustment of axial effort E14.

In this first embodiment, threaded portions 422 and 642 are directly machined on hubs 42 and 64.

In the second embodiment of the invention represented on FIG. 5, the elements equivalent to the ones of the first embodiment have the same references. Here-after, one describes only the differences with respect to the first embodiment.

In this second embodiment, a synthetic sleeve 18 is incorporated, radially with respect to axis X4, between hubs 42 and 64. More precisely, threaded portion 642 is provided radially inside hub 64, as in the first embodiment. On the other hand, sleeve 18 is rigidly attached to hub 42, e.g. by gluing, force-fitting, clipping or overmolding and it is provided on its outer peripheral surface with a threaded portion 182, which works as threaded portion 422 of the first embodiment. This allows a precise machining of threaded portions 182 and 642, in particular in case the material used for receiver housing 4 is not easily machined.

For instance sleeve 18 can be made of PA66.

According to a non-represented embodiment of the invention, sleeve 18 can be rigidly mounted onto hub 64 and provided with an inner threaded portion, whereas a thread is provided on the outer peripheral surface of hub 42.

According to still another embodiment of the invention, two sleeves can be provided and respectively secured to hubs 42 and 64, each sleeve being provided with a respective threaded portion.

In all embodiments, items 4 and 6 are made of aluminum. Alternatively, they can be made of an aluminum based alloy. However, they can also be made of a synthetic material or of steel.

Other modifications to the invention can be considered. For instance, several teeth equivalent to tooth 50 can be distributed on surface 48, around axis X4. Instead of being secured to lever arm 6, spring 14 can be secured to receiver housing 4. In such a case, one or several stops similar to tooth 50 are made on surface 68, in order to interact with free end 143 of spring coil 142.

In another variant, angle α equals 90° and end 146 of spring 14 jumps over the tooth 50 due to the coil shape of spring 14.

The invention has been described in case it is used in conjunction with a belt B. However, it can also be used with a chain.

The embodiments and alternative embodiments mentioned here-above can be combined in order to generate new embodiments of the invention.

The invention claimed is:

1. A tensioning device comprising:
   a receiver housing,
   a lever arm mounted on the receiver housing and rotatable with respect to the receiver housing around a first rotation axis,
   a pulley mounted on the lever arm and rotatable with respect to the lever arm around a second rotation axis parallel to the first rotation axis, and
   a spring mounted between the receiver housing and the lever arm and adapted to apply a torque for rotating the lever arm around the first rotation axis,
   wherein the receiver housing and the lever arm are screwed together around the first rotation axis,
   wherein the spring applies an axial damping effort, parallel to the first axis, on cooperating threaded portions respectively provided on the receiver housing and on the lever arm, wherein the cooperating threaded portions are directly formed on the receiver housing and on the lever arm.

2. The tensioning device according to claim 1, wherein the axial effort is a compression effort exerted by the spring.

3. The tensioning device according to claim 1, wherein a first end of the spring is integral, in rotation around the first rotation axis, with a first part selected amongst the receiver housing and the lever arm.

4. The tensioning device according to claim 3, further comprising a second part selected between the receiver housing and the lever arm, wherein the second part is provided with a stop for a second end of the spring.

5. The tensioning device according to claim 4, wherein the stop allows the second end of the spring to go over the stop upon screwing of the lever arm on the receiver housing and wherein the stop blocks the second end of the spring upon unscrewing of the lever arm with respect to the receiver housing.

6. The tensioning device according to claim 5, wherein in a direction orthoradial with respect to the first rotation axis, the stop includes a first surface inclined with respect to the first rotation axis, and a second surface parallel to the first rotation axis.

7. The tensioning device according to claim 1, wherein the receiver housing and the lever arm are made of one of aluminum or an aluminum based alloy.

* * * * *